March 22, 1966   S. I. STRASHUN ETAL   3,241,981
CONTINUOUS DEHYDRATION OF EDIBLE LIQUIDS
Filed July 24, 1953
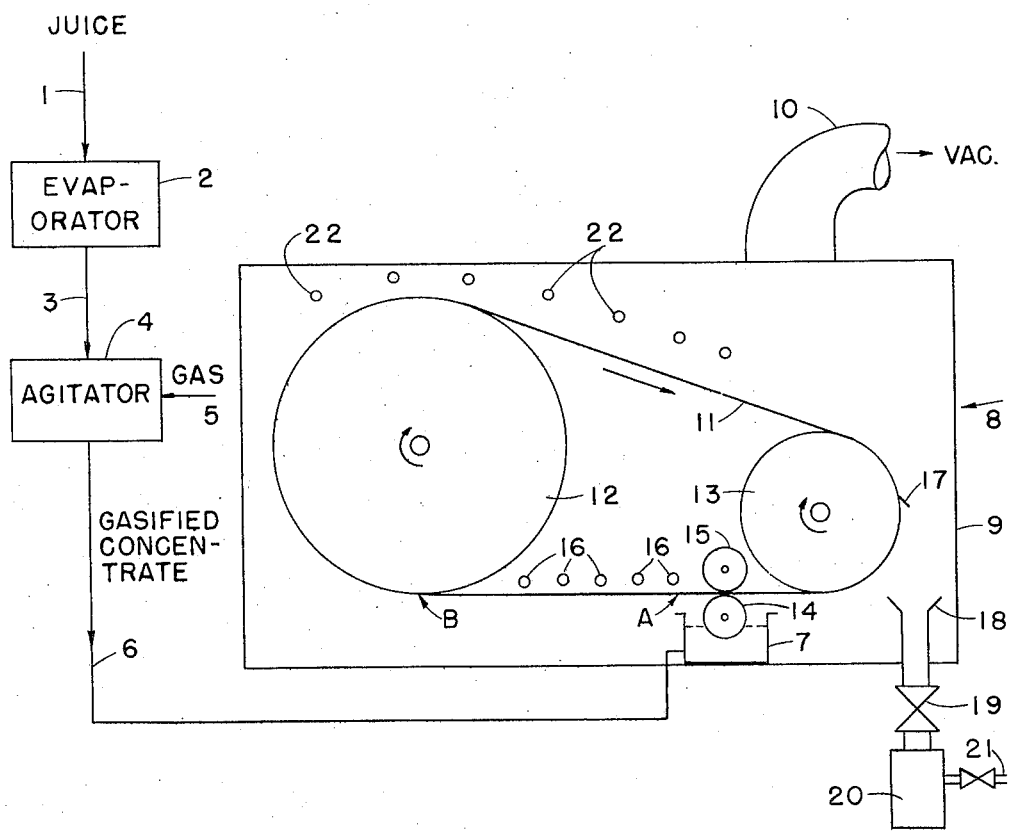
S. I. STRASHUN
W. F. TALBURT
INVENTORS
BY R. Hoffman
ATTORNEY ३,२४१,९८१
CONTINUOUS DEHYDRATION OF EDIBLE LIQUIDS
Sumner I. Strashun, El Cerrito, and William F. Talburt, Berkeley, Calif., assignors to the United States of America as represented by the Secretary of Agriculture
Filed July 24, 1953, Ser. No. 370,239
19 Claims. (Cl. 99—206)

A non-exclusive, irrevocable, royalty-free license in the invention herein described, throughout the world for all purposes of the United States Government, with the power to grant sublicenses for such purposes, is hereby granted to the Government of the United States of America.

This invention relates to the dehydration of liquid foodstuffs, particularly fruit juices. The objects of this invention include the provision of methods for effectuating the dehydration of edible liquids in a continuous manner with efficiency and economy of operation and without damage to the color, flavor, and nutritive properties of the liquid. A particular object of the invention is the provision of processes whereby edible liquids, especially fruit juices, can be continuously dehydrated, particularly in the absence of drying aids. Moreover, to obtain under such circumstances rapid and efficient dehydration and to produce a 100% fruit solids product which is in porous, free-flowing form exhibiting an extremely high rate of rehydration when contacted with water to prepare a reconstituted juice and which dehydration is accomplished without damage to the color, flavor, or nutritive value of the juice.

Additional objects and advantages of the invention will be apparent from the description herein taken in connection with the annexed drawing in which like numerals represent like parts. The single figure of the drawing is partly a schematic flow sheet illustrating the flow of materials and steps applied prior to dehydration; the figure also illustrates in vertical cross-section a dehydration apparatus which may be employed to carry out dehydrations in accordance with this invention.

In general, it is known that certain liquids can be dehydrated in a continuous manner by subjecting a thin film of the liquid, supported on a drum or flexible metallic belt, to dehydrating conditions of heat and vacuum. However, when this technique without modification is applied to fruit juices and other alimentary liquids, satisfactory results are not obtained in that the rate of dehydration is low, the product tends to stick to the drum or belt, the product is hard and dense so that it has a low rate of rehydration and the flavor and color of the product are damaged. It has now been found that liquid foodstuffs, even liquid fruit products which are notoriously difficult to dry because of their high sugar content, can be successfully dehydrated in a continuous manner by exercising control of the conditions of dehydration. Thus, a major factor in obtaining successful dehydration of fruit juices and other alimentary liquids is the expansion (or "puffing") of the liquid during dehydration. This situation is explained as follows:

In order for the dehydration to operate properly, the film of liquid must expand in volume to a large degree and remain such expanded condition throughout the process. When this expansion takes place the product is in a porous, sponge-like form—it is easy to remove from the belt or drum, breaking up readily into free-flowing particles or flakes which exhibit a very high rate of rehydration when contacted with water to prepare a reconstituted juice. Further, the expanded condition of the liquid makes for rapid dehydration in that water vapor can diffuse out of the mass readily. High temperatures with accompanying high dehydration rates can be employed because the rapid evaporation keeps the temperature of the material down so that heat damage to the material does not take place. Thus, despite the rapid removal of moisture and the high temperatures used, the natural color, odor, flavor and vitamin content of the products are not impaired.

The principles of this invention are primarily concerned with control of the factors of dehydration whereby to ensure extensive expansion (that is, about from 10 to 25 times in volume) of the liquid during dehydration and to maintain this expansion throughout the dehydration. It has been found that a primary factor in ensuring extensive expansion is the step of gasifying the liquid prior to application of dehydrating conditions. This gasification greatly enhances expansion and is so effective in this regard that it will cause extensive expansion hence successful dehydration of liquids which could not otherwise be dehydrated under the same conditions or which could only be dehydrated by using high levels of vacuum or by adding drying aids. By utilizing this step of gasification and control of other factors in accordance with this invention, successful dehydration of fruit juices and other alimentary liquids is attained in that the film of liquid will consistently expand to a large degree and remain in an expanded condition throughout the dehydration procedure. As a result, the dehydration proceeds rapidly and efficiently and yields a free-flowing, porous product which exhibits a very high rate of rehydration when contacted with water to make a reconstituted juice. In addition, no damage to the color, flavor, or vitamin content of the material is involved.

The manner in which the invention is carried out is described below, reference being made to the attached drawing which illustrates apparatus which may be employed to effectuate the technique of this invention.

The liquid foodstuff to be dehydrated is first prepared or otherwise obtained. For example, in applying the invention to liquid fruit or vegetable products, an edible liquid material of plant origin may be prepared as by reaming, pressing, macerating, crushing, comminuting or extracting with water the edible portions of fruit or vegetables as for example orange, grapefruit, lemon, lime, apple, pear, apricot, strawberry, raspberry, pineapple, grape, prune, plum, peach, cherry, tomato, celery, carrot, spinach, lettuce, water cress, and so forth. The liquid preparation may be clear, contain suspended pulp, or may even be thick like a puree.

Besides liquid foods of vegetative origin the invention may be applied to animal products as for example meat juices, meat extracts, soups, or lacteal products such as whole milk, skim milk, buttermilk, whey, cream, or milk containing added flavorings or nutrients such as sugar, chocolate, fruit juices, fruit pulps, and so forth.

The liquid preparation, however obtained, is introduced via pipe 1 into evaporator 2 wherein it is concentrated so that it will be in proper condition for the subsequent dehydration step. A single-strength juice or other liquid low in solids content cannot be subjected directly to dehydration because it will boil and spatter violently and will not expand properly. In the concentrated form the liquid can expand by entrapping steam bubbles and little boiling and spattering occurs. In general, the liquid is concentrated as much as possible to still obtain a flowable liquid. Thus the subsequent dehydration step necessitates starting with a liquid concentrate and, to decrease expense and time of dehydration, as much moisture as possible should be removed during the concentration to the point of obtaining a concentrate which is still capable of flowing. Further, in general a high level of concentration is more conducive to a high degree of expansion during dehydration. In many cases a satisfactory concentrate will have a density from about 35 to about 80° Brix. As conventional in the concentration of liquid food products, it is preferred to conduct the concentration under vacuum at a temperature not over about 50–150° F., the particular temperature being dependent on the heat-sensitivity of the liquid in question, thus to avoid heat damage to the material.

The concentrate is then introduced via pipe 3 into agitator 4. A gas is also introduced into the agitator via pipe 5, this gas being thoroughly whipped into the concentrate to form an intimate dispersion of the gas in the concentrate. Although air is the most convenient gas to use, it is often preferred to use nitrogen, carbon dioxide, or other inert, non-toxic gas whereby to minimize oxidative or other deleterious effects. For the dispersion of gas into the concentrate many different types of apparatus may be used, for example, the concentrate may be pumped through a conduit, a portion of which is of restricted cross-section to provide a venturi, the gas being introduced at the zone of high velocity and low pressure within the venturi and so thoroughly commingled and dispersed with the concentrate. Another plan is to place the concentrate in a sealed vessel and pump the gas under pressure through a perforated false bottom into the concentrate. A simple technique for adding air is to stir the concentrate with an agitator which periodically rises out of the level of liquid and in its return to the liquid forces air into it and beats this air into the concentrate. Another system is to stir into the concentrate some of the dehydrated final product from a previous run. This product being in an expanded, porous condition comprises a matrix of solid material with numerous voids dispersed throughout the solid matrix. These voids being actually filled with air, the stirring of the dehydrated material into the concentrate furnishes a simple and effective way of incorporating air. To reduce the size of the gas particles in the concentrate, the concentrate (after having the gas dispersed by the use of agitators or the like) may be passed through a colloid mill.

Referring once again to the drawing, the gasified concentrate is introduced via pipe 6 into feeding vessel 7 of dehydrator 8 which includes air-tight shell 9, duct 10 connected to a source of vacuum to maintain the interior of the dehydrator at a pressure of about 1 to 3 mm. Hg. There is also provided a flexible metallic belt 11 which traverses over heated drum 12 and cooled drum 13. As the gasified concentrate enters vessel 7 it is exposed to the vacuum within shell 9 whereby frothing occurs as some of the gas in the concentrate is liberated. The concentrate now in the form of a liquid froth or foam is applied in a thin film, having a thickness on the order of 0.005 to 0.1 inch, to the underside of belt 11. The optimum thickness of film to be employed in any particular instance will depend upon many factors such as the nature of the material being dried, the moisture content of the film, the speed of traversal of the belt, the temperature applied by drum 13, and so forth. With many fruit juice concentrates, a film thickness of about 0.006 to 0.020 inch gives efficient results. The means for applying this film comprises roller 14 which is positively rotated in a counter-clockwise directon and which is spaced from the belt a distance equal to the film thickness desired. Idler 15 is provided to maintain belt 11 in position. Other rollers or similar supporting devices can be used for example at the edges of belt 11 to maintain the position of belt 11 vis a vis roller 14. It is also evident that it is not essential to apply the film by means of a roller. Since this application of the film is essentially a coating process, any device used for coating a moving web with a uniform layer of material can be used. Examples are sprays, rotating brushes, fountains and the like. Wipers or scrapers may be provided to accurately define the thickness of the film.

The thin film of frothy concentrate applied to the underside of belt 11 is moved toward drum 12 which is hollow and through which steam or other heating medium is circulated thus to maintain the drum at a dehydrating temperature. The particular temperature to be employed in any particular instance will depend on several factors such as the nature and heat-sensitivity of the material being treated, the throughput of material, thickness of the film and rate of traverse of belt 11, and so forth. In the case of orange juice and other fruit juice concentrate, excellent results are obtained with a temperature on the order of 175°–300° F. The speed with which the dehydration takes place obviates damage to the heat-sensitive fruit materials. In any case the temperature of the drum 12 should be so regulated that the expanded concentrate is not heated to a temperature at which it would collapse. This is explained further below in connection with the pre-drying step.

Before arriving at heated, dehydrating drum 12, the applied film is preferably subjected to what may be termed a pre-drying. This takes place in the area between points A and B where the film is subjected to irradiation from radiant heaters 16 which are metallic rods heated to glowing temperature by electrical resistance coils embedded therein or which may be infra-red lamps or the like. The significance of this pre-drying which is a novel feature of this invention can be explained as follows: To obtain complete dehydration in the short time that the belt 11 is in contact with drum 12, it is necessary to maintain this drum at a high temperature, on the order of 175–300° F. If the film without pre-drying is applied by belt 11 to the hot drum, unfavorable results are often obtained. Thus as the film is initially heated by drum 12 it expands to a desirable degree but as the expanded film travels about drum 12 it may collapse, that is, shrink to about its volume before expansion. This phenomenon is caused by the expanded film assuming too high a temperature while its moisture content is still high. In effect the expanded film melts and loses its vapor bubbles which theretofore gave it an expanded structure. The pre-drying treatment has the effect of removing part of the moisture content of the film at a relatively low temperature whereby when the film contacts the hot drum its moisture content is decreased and its viscosity is increased to such an extent that it will maintain its expanded structure even though subjected to the high temperature of drum 12. In effect, the pre-drying stage has the effect of removing moisture from the film to increase what may be termed its pseudo-melting point, that is the temperature range in which the expanded film will collapse.

Although in this pre-drying treatment, it is preferred to use radiant heaters such as thus depicted by 16 in FIG. 1, it is evident that other types of heaters such as steam heated platens or rollers could be used to transfer heat by conduction. In any case the heaters are preferably placed on the side of belt 11 which does not bear the film. This prevents the heaters from becoming fouled with the minor amount of material which spatters from the film as it expands during the pre-drying. It is also preferred to use a series of individual heating elements so that the film is subjected to gradually increasing heating thus to prevent over-heating of the film while its moisture content is high. The heaters are thus preferably controlled to gradually increase the temperature of the film from its original level which would be around room temperature (or somewhat less due to the evaporative cooling effect of the vacuum in the dehydrator) up to a temperature in the neighborhood of that existing in drum 12, for example, up to about 175–300°, depending on the actual temperature applied to drum 12.

Referring again to the drawing, belt 11 carries the pre-dried film about drum 12 whereby the principal dehydration takes place. The dehydrated film still in its expanded condition then passes about drum 13 where the film is cooled so that it will lose its plastic character and become relatively brittle and easy to remove from the belt 11. The cooled product is removed from belt 11 by scraper 17 which may be provided with means for oscillating it in a horizontal plane to give increased dislodging effect. The cooled product falls from scraper 17 into hopper 18 from whence it can be removed via valve 19 to container 20. Container 20 is provided with a valved conduit 21 for connection to the source of vacuum so that container 20 can be evacuated prior to opening of valve 19.

Heaters 22 which are preferably radiant heaters of the same type as heaters 16 are provided so that the surface of the film away from belt 11 is properly dehydrated. In some instances where such heating is not provided, the upper surface of the film is dehydrated to a lesser extent than the bottom surface of the film with the result that the final product tends to roll up on scraper 17.

In an alternative, but less preferable, modification of this invention, the concentrate from evaporator 2 is directly fed into tank 7 where it is subjected to the dehydration as previously described. In this technique, the step of gasification is omitted. It has been observed that successful dehydration can be obtained under such conditions if a high degree of vacuum is used and/or a drying aid is added to the concentrate. Regarding the use of an increased vacuum, it has been found that such condition causes extensive expansion of the concentrate and maintains this level of expansion throughout the dehydration possibly by lowering the actual temperature of the product due to an increased evaporative cooling effect. Thus, with many fruit juices, by conducting the dehydration under a high degree of vacuum, the step of gasification may be omitted. The particular degree of vacuum required in any specific instance to achieve such an effect will depend on the nature of the liquid in question, the degree of concentrate, the temperature applied by drum 12, and so forth. The degree of vacuum to be applied can be associated by adjusting it periodically while noting the condition of the dried film through a sight-glass in the side of dehydrator 8. In the case of orange juice and other fruit juices it has been found that using a pressure of about 1.5 mm. of Hg or below is satisfactory and under such circumstances the step of gasification can be omitted. It is to be emphasized however that it is preferred to use the technique of gasification rather than that of high vacuum. Regarding the use of drying aids, these materials alter the physical nature of the concentrate so that expansion is enhanced. As the drying aid one may employ for example, methyl cellulose, carboxy methyl cellulose, dextrin, corn syrup, corn syrup solids, etc. The amount of drying aid required in any particular instance will depend on the nature of the liquid in question, the degree to which it has been concentrated, and the efficacy of the particular drying aid. In general, the proportion of drying aid may be in the range from about 1 to 50% based on the fruit or vegetable solids in the concentrate. The proper amount of drying aid to add in any case can easily be determined by adding various proportions of the aid to samples of the concentrate and subjecting the samples in the form of thin film to vacuum and heat to observe which proportion causes a continued expansion of at least 3 times, preferably 10-25 times in volume. Although the use of drying aids will enhance expansion, their use is generally not preferred because of the factor of adding a foreign material to the juice. It is thus preferred to utilize the technique of gasification to obtain and maintain the desired expansion during concentration. It is obvious that where it is desired to use a drying aid, if the concentrate is also gasified, the amount of drying aid can be correspondingly reduced to obtain the same effect. This is demonstrated below in Example II.

In the processing of some liquid materials derived from fruits and vegetables it may be necessary to remove part of the pulp prior to dehydration to ensure extensive expansion during the dehydration stage. For example, tomato juice normally contains about 20-30% by volume of pulp and in this condition will not expand sufficiently in dehydration. Thus with this juice, the pulp content is first reduced to less than about 6% by screening or centrifuging; then the partly de-pulped juice is subjected to concentration and dehydration as described. The removed pulp may be separately dried in a vacuum drier or other conventional drier and admixed with the dried partly depulped juice. In the case of orange juice, successful expansion during dehydration can be achieved with ordinary juice which contains about 12% pulp by volume. If however it is desired to dehydrate an orange puree or other liquid orange preparation containing more pulp than does juice, then part of the pulp must first be removed so that the liquid being treated does not contain more than about 12% pulp by volume. Whether any particular edible liquid will expand properly on dehydration can easily be determined by concentrating it then placing the concentrate on the surface of a heater which is surrounded by a bell jar. The interior of the jar is evacuated while the heater surface is brought up to 200-212° F. The concentrate is observed to see if it expands. If the material expands at least three times, preferably 10-25 times, in volume, the pulp content is not too high and the material may be successfully processed. If the degree of expansion is less than specified above a decrease in pulp content will be required to make the juice amenable to dehydration.

In the event that pulp is removed from the liquid prior to dehydration, it is preferable to then separately dehydrate the pulp and add it back to the dehydrated liquid so that the final product will form on reconstitution a liquid of the desired pulp content. It is to be noted that dehydration of the separated pulp presents no problem as it may easily be dried in many different types of apparatus. For example, it is preferred to dry it in a vacuum tray drier or continuous vacuum drier as herein disclosed. Because of its high fiber content, the pulp does not shrink during dehydration but maintains its original volume and forms a porous mass which is easy to remove from the trays and which is easy to break up into small fragments. Further, it slurries very rapidly when agitated with water and thus its addition to the dehydrated liquid fraction does not decrease the rate of reconstitution. Since the pulp has properties which make it easy to dry it can be dried in various devices such as dryers of the drum, cabinet, or rotary kiln type.

In the dehydration of some fruit juices, purees, etc., it may be necessary to make some provision for returning volatile flavoring materials which are vaporized during the concentration and/or dehydration. In the case of tomato and apricot products such provisions are not necessary as the dehydrated product retains its natural flavor and odor. In the case of orange, apple, pineapple, strawberry, raspberry, and many other fruit products provision should be made to restore flavoring substances to obtain a high-quality product. The restoration of flavor may be carried out in several different ways. In one technique, the volatile flavoring component is mixed with molten, supercooled sorbitol and the mixture allowed to crystallize.

The sorbitol containing absorbed flavoring material is then incorporated with the dehydrated juice to furnish the approximately original amount of flavoring component. The use of sorbitol to absorb the flavoring component is preferred as thereby the flavor is stabilized and prevented from vaporizing. In same cases, absorption of the flavoring component on other solid materials such as sucrose, dextrose, gelatin, pectin, etc. can be applied. As an alternative, the volatile flavoring component can be sealed in a gelatin capsule or other container made of soluble material and placed in the package together with the dehydrated product. Another technique is to add to the concentrate, prior to dehydration, a volatile flavoring component in such proportion that after loss by volatilization during dehydration enough of the flavoring component will remain to give the final product a natural flavor and odor.

The flavoring substance which is used for incorporation with the sorbitol may be obtained in various ways. For example the vapors evolved during concentration and/or dehydration of the original juice may be treated to recover the vaporized flavoring substances contained therein. Apparatus and processes for accomplishing such ends are well known to those skilled in the art. This technique is particularly adapted for use with such fruit juices as apple, pear, grape, strawberry, raspberry, cherry, pineapple, etc. If desired the original juice may be subjected to a special operation such as stripping at atmospheric pressure for the deliberate removal of volatile flavoring substances from the juice prior to carrying out the dehydration. Such a technique is preferable because the volatile essences are recovered from a relatively smaller volume of vapor than in the system where the primary aim is concentration or dehydration. The volatile essences recovered from the vapors evolved in stripping, concentration, or dehydration are preferably purified and concentrated so that they will emulsify properly with the molten sorbitol and yield flavor-stabilized compositions. A great deal of the water in the essences can be removed by distillation in efficient rectifying columns. Further purification to remove water and low-molecular weight alcohols can be accomplished by extracting the flavoring components from the distilled essence with isopentane or other hydrocarbon solvent in which water and low molecular weight alcohols are essentially insoluble. Also to achieve proper emulsification of the purified flavoring substances with the molten sorbitol, an edible oil such as rice oil may be incorporated with the flavoring substance prior to admixture with the molten sorbitol. This technique of recovery of the volatile essences from vapors evolved in concentration or dehydration, followed by purification and concentration of the essence is particularly adapted for use with non-citrus products such as apple, pear, grape, peach, pineapple, cherry, raspberry, strawberry, prune, plum, and the like. In the case of citrus products, it is preferred to use peel oil of the citrus fruit in question as the flavoring substance rather than recovering the flavoring components from the vapors evolved in evaporation treatments. Thus for the flavor-enhancement of dehydrated orange juice, the preferred flavoring ingredient is cold-pressed orange peel oil which is actually the substance which gives fresh orange juice its characteristic flavor. Similarly, grapefruit peel oil would be used for dehydrated grapefruit juice, lemon peel oil for dehydrated lemon juice, and so forth. The citrus peel oils are naturally in a concentrated state and can be directly emulsified with the molten sorbitol.

It is often desirable to add sulphur dioxide or other sulphiting agent to the liquid being treated to stabilize the final product and prevent browning during processing and storage of the finished article, particularly if stored at elevated temperatures. To this end sulphur dioxide, sodium sulphite or bisulphite is added in such amount that the dehydrated product will contain about from 50 to 250 p.p.m. of $SO_2$. A convenient point to add the sulphite or bisulphite is to the liquid concentrate prior to dehydration. If necessary, ascorbic acid or fat-stabilizing antioxidants such as those listed below may be added to the final product or to the liquid at any stage in the processing to prevent oxidation of flavoring and/or other oxidizable components. A convenient plan for adding the antioxidant is to incorporate it together with the flavoring substance and sorbitol in preparing the composition for fortifying the flavor of the dehydrated product. Addition of the antioxidant to the sorbitol-flavoring component composition will further minimize the possibility of loss in flavor of the final product, that is, the mixture of dehydrated fruit or vegetable solids and the flavoring agent-sorbitol composition. In general, the amount of antioxidant applied may be from about 0.001% to about 0.1% of the weight of the fruit or vegetable solids. Examples of antioxidants are:

Tocopherols, i.e., alpha-, beta-, and gamma-tocopherol.
Gum guaiac.
Nordihydroguaiaretic acid.
Gallic acid and its esters as for example, the propyl, butyl, amyl, hexyl, octyl, dodecyl, tetradecyl, hexadecyl, and octadecyl esters.
Ascorbic acid and isoascorbic acid and their esters, as for example, ascorbyl or isoascorbyl palmitate, stearate, and so forth.
Thiodipropionic acid and its esters, as for example, the dioctyl and the didodecyl esters.
Phenolic derivatives, as for example, butylated hydroxyanisole; catechol monobenzoate; 2-tert-butyl, 4-methoxy phenol; p-tert-butyl catechol; 2,4-dimethyl-6-tert-butyl phenol, dibenzyl catechol; octyl cresol; 2,7-dihydroxy naphthalene; 2,5-dihydroxy diphenyl; and so forth.
Hydroquinone derivatives, as for example, 2,5-ditert-butyl hydroquinone; 2,5-dibenzyl hydroquinone; 2,5-ditert-amyl hydroquinone; 2,5-bis(dimethylaminomethyl) hydroquinone; 2,5-bis(dimethylaminomethyl)-3,6-di-tert butyl hydroquinone; 2,5-bis(dimethylaminomethyl)-3,6-ditert butyl quinone; 2,5-bis(dimethylaminomethyl)-3,6-di-tert amyl hydroquinone; 2,5-bis(dimethylaminomethyl)-3,6-di-tert amyl quinone; and so forth.
Quinoline derivatives, as for example, 6-ethoxy-2,2,4-trimethyl-1,2-dihydroquinoline; 6-phenyl-2,2,4-trimethyl-1,2-dihydroquinoline; 2,2,4-trimethyl - 1,2-dihydroquinoline; etc.
Hydrocaffeic acid and its esters, for example, ethyl hydrocaffeate.
Pyrogallol derivatives, as for example, 4-acetyl pyrogallol; 4-propionyl pyrogallol; 4-butyryl pyrogallol; 4-valeryl pyrogallol; 4-isovaleryl pyrogallol; 4-(diethylacetyl) pyrogallol; 4-acetyl-6-ethyl pyrogallol; 4-acetyl-6-tert. butyl pyrogallol; and so forth.

The dry product which preferably contains not more than about 4% moisture, is packaged in tin cans or other containers which can be sealed to an air tight condition. It is obvious that since our product is virtually completely dehydrated it is not perishable and may be kept indefinitely at room temperature or higher. For reconstitution the calculated amount of water is poured onto the dehydrated product and after agitation for a few seconds is ready to serve.

In packaging the dehydrated products it is often advantageous to insert in the sealed package a porous container holding a desiccant. The desiccant has the effect of removing the last traces of moisture from the dehydrated product whereby to increase its stability and shelf life. It is known that for maximum stability the dehydrated products should have a moisture content of less than 1%. However, to obtain such a low moisture level by dehydration would require an excessive period of time and increase the possibility of heat damage. For this reason by the use of a desiccant the powder may be packaged at say 3% moisture content and the desiccant will gradually lower the moisture content of the product to minimum levels during storage. Although it is preferred to use calcium oxide as the desiccant, one may also use calcium chloride, magnesium perchlorate, calcium sulphate, and the like.

The invention is demonstrated in greater detail by the following examples. Procedures outside the scope of the invention are included for comparative purposes. In all cases the dehydrations were conducted in a dehydrator as described above. Drums 12 and 13 were 3.75 ft. and 2 ft., respectively, in diameter and separated 46 inches center to center. Belt 11 was 2 ft. wide. Drum 13 was maintained at a constant temperature of about 40° F. Radiant heaters 16 were 5 in number, 2 ft. long, separated 4 inches center to center and spaced ¾" from the center of the heater to the belt. Radiant heaters 22 were 4 inches apart, nine in number and 3½" from the belt.

EXAMPLE I

A. *Aeration of concentrate*

A lot of fresh orange juice was concentrated to 60° Brix by high-vacuum, low-temperature evaporation. The concentrate was then subjected to vigorous agitation with a motor-driven propellor-type agitator. The position of the propellor was set near the surface of the liquid to create a vortex and draw air into the liquid and disperse the air throughout the liquid. The aerated concentrate was then introduced into a dehydrator as described above to produce solid, dehydrated orange juice. Operating conditions of the dehydrator were as follows:

| | |
|---|---|
| Temperature of drum 12 | 202° F. |
| Belt speed | 7.5 ft./min. |
| Contact time between belt and drum | 54 sec. |
| Thickness of film | approx. 0.006 inch. |
| Pressure in dehydrator | 2.5 mm. Hg. |
| Production rate of dehydrated product | 20 lbs./hr. |
| Moisture content of product | 2.3%. |

It was observed that the film of orange juice concentrate expanded 20 to 25 times in volume during the dehydration and maintained such expanded volume throughout. Thus the dehydration proceeded rapidly and efficiently, the product was readily removed from the belt by the scraper and the product was in porous condition so that on agitation with water for a few seconds it formed a reconstituted juice. The reconstituted juice had a natural color and its taste was good though somewhat lacking in aroma (due to vaporization of volatile flavoring essences during dehydration). The dehydration did not cause development of any off odors or off-flavors.

In order to demonstrate the effectiveness of the aeration of the concentrate prior to dehydration, a series of runs were carried out on the same orange juice concentrate used in part A but omitting the aeration step in each case. The individual runs were carried out as follows:

B. In this case the non-aerated concentrate was applied to the dehydrator using the same conditions as set forth in part A. It was observed that the dehydration was unsuccessful in that the concentrate film did not expand with the result that the product stuck to the belt and could not be removed with the scraper. Eventually the belt became covered with a brown hard layer of product.

C. In this run the non-aerated concentrate was subjected to dehydration under increased vacuum (1.3 mm. as against 2.5 in part A). This run was successful because of the use of this high degree of vacuum. The conditions employed are listed below:

| | |
|---|---|
| Temperature of drum 12 | 192° F. |
| Belt speed | 15 ft./min. |
| Contact time between belt and drum | 26.5 sec. |
| Thickness of film | approx. 0.006 inch. |
| Pressure in dehydrator | 1.3 mm. Hg. |
| Production rate of dehydrated product | 12½ lbs./hr. |
| Moisture content of product | 1.3%. |

It was observed that the film of orange juice concentrate expanded about 20–25 times in volume during dehydration and maintained such expansion throughout. The dehydration proceeded rapidly and efficiently, the product was readily removed from the belt by the scraper and the product was in a porous condition so that on agitation with water for a few seconds it formed a reconstituted juice.

D. Several runs were made to attempt to dehydrate the non-aerated concentrate using the same conditions as set forth in part A. In each case a different proportion of corn syrup solids (drying aid) was incorporated in the concentrate. In each case the concentrate was de-aerated prior to dehydration to remove air added during the step of incorporating the drying aid. It was observed that satisfactory dehydration, that is, expansion of the concentrate and maintaining of this expansion, was not obtained until the proportion of corn syrup solids was increased to 40%, based on the weight of orange juice solids in the concentrate.

EXAMPLE II

A. *Aeration of concentrate*

To a lot of orange juice concentrate was added 1.5% of its weight of sodium carboxymethyl cellulose using vigorous agitation to disperse this drying aid into the concentrate and also to draw air into the mixture and disperse it thoroughly therein. The aerated concentrate (60° Brix) was then dehydrated in the apparatus heretofore described. Operating conditions were as follows:

| | |
|---|---|
| Temperature of drum 12 | 233° F. |
| Belt speed | 40 ft./min. |
| Contact time between belt and drum | 10.2 sec. |
| Thickness of film | about 0.010 inch. |
| Pressure in dehydrator | 2.8 mm. Hg. |
| Production rate of dehydrated product | 33 lbs./hr. |

It was observed that the film of orange juice concentrate expanded 20 to 25 times in volume during dehydration and maintained such expanded volume throughout. Thus dehydration proceeded rapidly and efficiently, the product was readily removed from the belt by the scraper and the product was in a porous condition so that on agitation with water for a few seconds it formed a reconstituted juice.

B. *No aeration of concentrate*

In a comparative experiment, the orange juice concentrate was mixed with a previously prepared solution of sodium carboxymethyl cellulose using enough of this solution to add 1.5% of this drying aid. In this case the mixing was gentle to avoid incorporating air into the concentrate. The resulting non-aerated concentrate (60° Brix) was applied to the dehydrator using the same conditions as in part A. It was observed that the dehydration was unsuccessful in that the concentrate film did not expand significantly with the result that the product stuck to the belt and could not be removed with the scraper. Eventually the belt became fouled with a brown hard layer of overheated material.

C. *No aeration but additional drying aid*

In another comparative experiment, the drying aid was added in solution form as in part B with gentle agitation. In this case however the proportion of sodium carboxymethyl cellulose was increased to 3.25%. The resulting non-aerated concentrate (60° Brix) was applied to the dehydrator using the same conditions as in part A. It was observed that dehydration was successful, the concentrate expanded 20–25 times in volume and remained expanded throughout. The dehydrated product was porous, easily removable from the belt and exhibited a very high rate of rehydration when contacted with water.

EXAMPLE III

A quantity of sorbitol was heated to about 200° C. to drive off any water that might be present therein. The molten sorbitol was then cooled to 80° C. and 10% of its weight of cold-pressed orange peel oil was incorporated therein with vigorous agitation. The mix was cooled to about 71° C. and a minor proportion (about 0.5%) of sorbitol crystals (metastable solid form) was stirred in to promote crystallization to the metastable form of sorbitol. The melt was poured onto a slab, allowed to cool and solidify. The solid composition was then ground into the form of granules and subjected to vacuum to remove the minor amount of oil existing on the outside of sorbitol crystals rather than entrapped therein.

The sorbitol-orange peel oil composition (5.0 grams) was then intimately mixed with 1000 grams of the dehydrated orange juice prepared as above described. The resulting final product was packed in sealed tin cans, each can containing 100 g. of the product together with a packet made of a porous paper containing 12 g. calcium oxide as a desiccant. Samples of the product were stored and tasted from time to time. It was found that even after storage for 6 months at 100° F. the products remained free flowing and on stirring with water for a few seconds formed a reconstituted juice, the flavor of the juice being excellent in that it was virtually undistinguishable from freshly prepared orange juice.

Having thus described the invention, what is claimed is:

1. A process for preparing a dehydrated product from a fruit juice which comprises concentrating such juice to form a liquid concentrate of about 35 to 80° Brix, incorporating a gas from the group consisting of air and inert, non-toxic gases into said concentrate with vigorous agitation to form a thorough dispersion of the gas in the concentrate, forming the gasified concentrate into a thin film, and continuously transporting said film through a zone where the film is subjected to dehydrating conditions of vacuum and heat, the pressure applied being about from 1 to 4 mm. Hg, the temperature being about from 175 to 300° F.

2. A process for continuously dehydrating a fruit juice which comprises concentrating such juice to form a liquid concentrate of from about 35 to 80° Brix, incorporating air into said concentrate with vigorous agitation to form a thorough dispersion of air in the concentrate, forming the aerated concentrate into a film having a thickness of about from 6 to 20 thousandths of an inch, continuously transporting said film through a zone where the film is subjected to dehydrating conditions of vacuum and heat, the pressure applied being about from 1 to 4 mm. Hg, the temperature being about from 175 to 300° F., the time of residence in said zone being about from 10 to 60 seconds, then immediately cooling the resulting dehydrated film which is expanded about from 10 to 25 times in volume by the action of the dehydrating conditions.

3. A process for preparing a solid dehydrated product from a liquid foodstuff which comprises concentrating a liquid foodstuff to produce a liquid concentrate of such density that when exposed to heat and vacuum it will expand by entrapment of gaseous bubbles, incorporating a gas from the group consisting of air and inert, non-toxic gases into said liquid concentrate with vigorous agitation to form a thorough dispersion of the gas in the concentrate, then exposing the gasified concentrate to dehydrating conditions of heat and vacuum and maintaining the concentrate in an extensively expanded condition throughout dehydration.

4. A process for preparing a solid dehydrated product from a liquid foodstuff which comprises concentrating a liquid foodstuff to produce a liquid concentrate having a density from about 35° to about 80° Brix, incorporating a gas from the group consisting of air and inert, non-toxic gases into said liquid concentrate with vigorous agitation to form a thorough dispersion of the gas in the concentrate, then exposing the gasified concentrate to dehydrating conditions of heat and vacuum and maintaining the concentrate in an extensively expanded condition throughout the dehydration.

5. A process for preparing a solid dehydrated product from fruit and vegetable liquid foodstuffs which comprises concentrating such a liquid foodstuff to produce a liquid concentrate having a density from about 35° to about 80° Brix, incorporating a gas from the group consisting of air and inert, non-toxic gases into said concentrate with vigorous agitation to form a thorough dispersion of the gas in the concentrate, then exposing the gasified concentrate to dehydrating conditions of heat and vacuum and maintaining the concentrate in an extensively expanded condition throughout the dehydration.

6. The process of claim 5 wherein during the dehydration the concentrate is maintained in an expanded condition, having a volume from about 10 to about 25 times that of its original volume, throughout the dehydration.

7. The process of claim 5 wherein during the dehydration the heat applied to the concentrate is increased gradually to prevent collapse of the expanded concentrate.

8. The process of claim 5 wherein the liquid concentrate is gasified by incorporating therein a dehydrated foodstuff in an expanded, porous, air-containing condition.

9. The process of claim 5 wherein the liquid foodstuff is a fruit juice.

10. The process of claim 5 wherein the liquid foodstuff is a fruit juice free from foreign substance.

11. In the continuous process for dehydrating a comestible concentrate consisting of passing said concentrate in a stream from an inlet point to a discharge point separated and entirely disassociated from said inlet point; subjecting said concentrate to sub-atmospheric pressure during its travel from said inlet point to said discharge point; forming said stream into a continuous web of uniform thickness after the commencement of its passage from said inlet point to said discharge point; subjecting said web to heat, puffing said web, and removing moisture from said web during a heating stage of its passage from said inlet point to said discharge point and until the moisture content of the web has been reduced to the desired level; thereafter rapidly cooling said web, as so dehydrated during a cooling stage of its travel; and then discharging said web as so dehydrated and cooled, from said discharge point; the improvement which includes: supplying heat to said web during said heating stage in sufficient quantity to maintain said web at its pseudo-melting point throughout at least the major portion of said heating stage.

12. The process claimed in claim 11 in which the comestible concentrate is citrus juice concentrate.

13. The process claimed in claim 11 in which the comestible concentrate is orange juice concentrate.

14. In the continuous process for dehydrating a comestible concentrate consisting of passing said concentrate in a stream from an inlet point to a discharge point separated and entirely disassociated from said inlet point; subjecting said concentrate to sub-atmospheric pressure during its travel from said inlet point to said discharge point; forming said stream into a continuous web of uniform thickness after the commencement of its passage from said inlet point to said discharge point; subjecting said web to heat, puffing said web, and removing moisture from said web during a heating stage of its passage from said inlet point to said discharge point and until the moisture content of the web has been reduced to the desired level; thereafter rapidly cooling said web, as so dehydrated, during a cooling stage of its travel; and then discharging said web, as so dehydrated and cooled, from said discharge point; the improvement which includes; subjecting said web to a plurality of discrete increments of radiant heat throughout the duration of said heating stage; and adjusting said discrete increments of radiant heat so as to maintain said web at the pseudo-melting point of said web throughout at least the major portion of said heating stage.

15. The process claimed in claim 14 in which the comestible concentrate is citrus juice concentrate.

16. The process claimed in claim 14 in which the comestible concentrate is orange juice concentrate.

17. In the continuous process for dehydrating a comestible concentrate consisting of passing said concentrate in a stream from an inlet point to a discharge point separated and entirely disassociated from said inlet point; subjecting said concentrate to sub-atmospheric pressure during its travel from said inlet point to said discharge point; forming said stream into a continuous web of uniform thickness after the commencement of its passage from said inlet point to said discharge point; subjecting said web to heat, puffing said web, and removing moisture from said web during a heating stage of its passage from said inlet point to said discharge point and until the moisture content of the web has been reduced to the desired level; thereafter rapidly cooling said web, as so dehydrated, during a cooling stage of its travel; and then discharging said web, as so dehydrated and cooled, from said discharge point; the improvement which includes: subjecting both sides of said web to a plurality of discrete increments of radiant heat during said heating stage; and adjusting said discrete increments of radiant heat so as to maintain said web at the pseudo-melting point of said web throughout at least the major portion of said heating stage.

18. The process claimed in claim 17 in which the comestible concentrate is citrus juice concentrate.

19. The process claimed in claim 17 in which the comestible concentrate is orange juice concentrate.

References Cited by the Examiner
UNITED STATES PATENTS

| | | | |
|---|---|---|---|
| 1,012,578 | 12/1911 | Andrews | 99—202 X |
| 1,250,427 | 12/1917 | Campbell | 99—201 |
| 1,624,153 | 4/1927 | Twight | 99—206 X |
| 1,975,998 | 10/1934 | Wilson | 99—206 |
| 2,067,205 | 1/1937 | Robison et al. | 99—202 X |
| 2,143,256 | 1/1939 | Andrews | 99—202 |
| 2,328,554 | 9/1943 | Heyman | 99—206 X |
| 2,358,418 | 9/1944 | Rosecky | 99—202 |
| 2,490,951 | 12/1949 | Dunkley | 99—208 X |
| 2,567,038 | 9/1951 | Stevens et al. | 99—205 |

FOREIGN PATENTS

| | | |
|---|---|---|
| 10,715 | 8/1900 | Great Britain. |
| 524,371 | 8/1940 | Great Britain. |

A. LOUIS MONACELL, *Primary Examiner.*

JAMES S. BAILEY, ABRAHAM H. WINKELSTEIN, TOBIAS E. LEVOW, *Examiners.*

H. LORD, R. N. JONES, H. W. SILSBY,
*Assistant Examiners.*